Patented June 9, 1925.

1,540,883

UNITED STATES PATENT OFFICE.

ISAAC F. HARRIS, OF TUCKAHOE, NEW YORK.

VITAMINE PREPARATION.

No Drawing.   Application filed December 26, 1919. Serial No. 347,502.

*To all whom it may concern:*

Be it known that I, ISAAC F. HARRIS, a citizen of the United States, and a resident of Tuckahoe, Westchester County, State of New York, have invented an Improvement in Vitamine Preparations, of which the following is a specification.

My invention relates to "vitamine"-containing bodies, particularly to bodies containing water-soluble "vitamines" and intended for use as food compounds. It is an object of my invention to so incorporate the "vitamine" body, particularly of the water-soluble variety, in the food compound that the same will be rendered stable and substantially permanent, a further object of my invention being to provide a method for so stabilizing "vitamines", especially when present in food or similar compounds.

By way of example, I shall describe illustrative embodiments of the product and method of my invention in the accompanying specification, it being clearly understood that my invention is not limited to the specific embodiments thereof herein set forth for purposes of illustration only.

As my starting material I prefer to employ a water-soluble "vitamine" body more particularly a highly concentrated "vitamine" body, preferably in powder form, such, for example as may be obtained from living yeast cells. Such a body and the method of preparing the same are fully set forth in my copending application, Ser. No. 347,503, filed December 26, 1919.

This "vitamine" body is a light, yellow-brown, very hygroscopic powder, having an odor and taste similar to extract of beef. It is readily soluble in cold water, producing a perfectly clear solution. It is freely soluble in 52% ethyl alcohol, but is less soluble in ethyl alcohol stronger than 80%, and substantially insoluble in absolute alcohol. Its aqueous solutions are light brown to dark brown, according to the concentration of the solution. Its solutions have a taste similar to extract of beef and have other properties of a mixture of peptones, propeptones and amino acids. It is substantially free from coagulable proteins and gives reactions for the amino groups, but does not give the "biuret" reaction. Solutions of this product give copious precipitates with phospho-tungstic acid, which, however, does not precipitate everything from the solution. Its aqueous solutions are also partly precipitated by solutions of barium hydroxide, silver nitrate, mercuric chloride or lead acetate. The dry powder, when burned, leaves about 12–15% of ash.

One method of preparing the foregoing "vitamine" substance as set forth in my copending application referred to above comprises, briefly, boiling said cells with water acidified with about one per cent of acetic acid, filtering, drying the filtrate in vacuo and at a low temperature, thereafter extracting the dried product with an aqueous solution of ethyl alcohol of about 52% strength, filtering, and thereafter reducing the filtrate to dryness, further extracting this residue with 80% to 90% ethyl alcohol, filtering, and dehydrating the precipitate with such drying agents as anhydrous alcohol, anhydrous acetone and anhydrous ether.

I have discovered that "vitamine" bodies, particularly water-soluble "vitamine" bodies, such as the substance described and claimed in my copending application referred to above, require a certain amount of protection from atmospheric conditions. The "vitamine" bodies such as described in my copending application are hygroscopic to a considerable degree and if they absorb moisture a bacterial and chemical decomposition may set in which may destroy the efficacy of the "vitamine" preparation and might under certain circumstances produce toxic effects. It is also evident that a "vitamine" body such as the substance described in my copending application, should in view of the fact that it is intended to be administered by relatively unskilled persons, be put up in such a form, or combined with such other substances as to make its administration simple and the dosage exact.

I have discovered that sugar may be used to preserve the "vitamine" bodies without deleteriously affecting them. For this purpose, I use preferably a relatively non-hygroscopic sugar and in view of the fact that the "vitamine" bodies are principally intended for use in infant feeding, I preferably employ a lactose or sugar of milk. When desired, a variable quantity, preferably an equal amount by weight, of galactose, may be added. The proportions generally used are four to ten parts by weight of sugar to one part by weight of the "vitamine" body. The materials are intimately mixed, this intimate mixture being desirable to enclose and surround the particles of the "vitamine" bodies by the protecting sugar.

I have also discovered that the mixture of sugar and "vitamine" body, especially of the water-soluble variety, such as described and claimed in my copending application referred to above, is rendered more stable and the preservative action of the sugar increased by densifying or pressing the mixture, as by making tablets of the same by molding under pressure, which also renders the preparation more convenient to use and administer.

It will be evident that by mixing the "vitamine" body and the sugar in the manner set forth above, that the powder and tablet produced by the process described, and particularly the tablet form, affords a very easy and convenient method of administration by relatively unskilled persons. For instance, in infant food, where the addition of a given quantity of sugar of milk to the food is prescribed, this amount may be added without taking into account the "vitamine" bodies, since they have previously been mixed with the sugar of milk in the desired proportion and a physician may prescribe the use of sugar of milk containing a greater or less quantity of "vitamine" bodies, as required. When added to a liquid food, the combined sugar of milk and "vitamine" bodies are readily water soluble and can be readily dissolved in liquid foods, such as natural or prepared milks forming a clear solution.

What I claim is:

1. A food compound comprising a "vitamine" body and equal parts of lactose and galactose.

2. A food compound comprising a "vitamine" body derived from living yeast cells and equal parts of lactose and galactose.

In testimony whereof I have signed my name to this specification this 24th day of December, 1919.

ISAAC F. HARRIS.